United States Patent Office 2,715,322
Patented Aug. 16, 1955

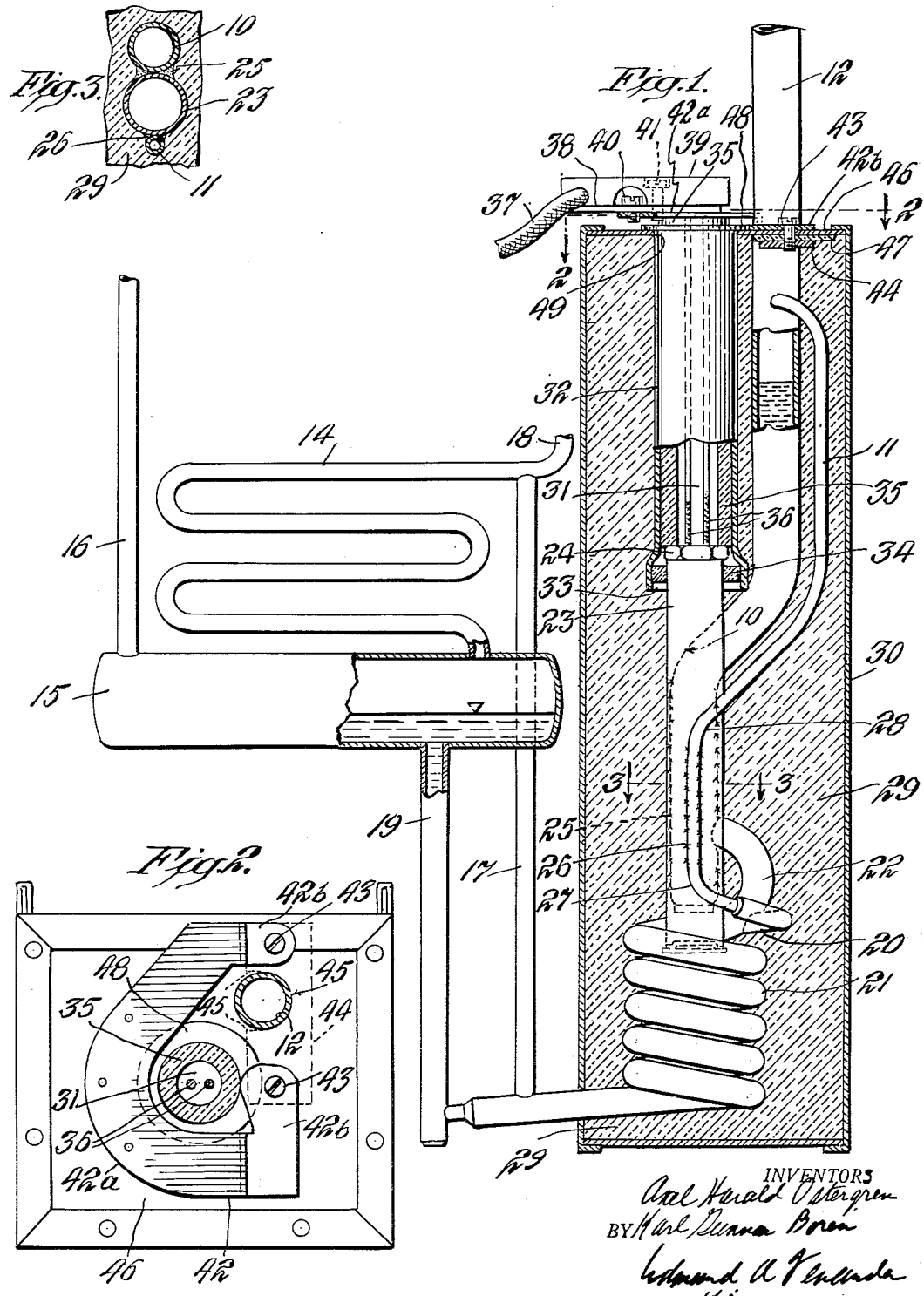

2,715,322
ABSORPTION REFRIGERATION

Axel Harald Ostergren and Karl Gunnar Boren, Stockholm, Sweden, assignors to Aktiebolaget Elektrolux, Stockholm, Sweden, a corporation of Sweden Application September 25, 1951, Serial No. 248,126
Claims priority, application Sweden October 3, 1950
7 Claims. (Cl. 62—119.5)

Our invention relates to absorption refrigeration apparatus, and more particularly to boilers or generators of such apparatus in which vapor is expelled out of solution with the aid of an electrical heating element.

It is an object of our invention to provide an improved electrically operated generator or vapor expulsion unit of this type which is efficient in operation and simple and inexpensive to manufacture.

Another object of the invention is to provide an improved electrically operated generator or vapor expulsion unit in which heat losses are materially and effectively reduced whereby a refrigerator of a given size may be operated with an electrical heating element of minimum rating.

A further object of the invention is to provide such an improved electrically operated generator or vapor expulsion unit in which removal of the heating element for inspection or replacement can be expeditiously effected without difficulty.

The invention, together with the above and other objects and advantages thereof, will be more fully understood upon reference to the following description and the accompanying drawing forming a part of this specification, and in which:

Fig. 1 illustrates more or less diagrammatically an absorption liquid circuit of absorption refrigeration apparatus including a generator embodying the invention;

Fig. 2 is a view, taken at line 2—2 of Fig. 1, to illustrate details more clearly; and Fig. 3 is a fragmentary sectional view taken at line 3—3 of Fig. 1.

In the drawing the invention is embodied in absorption refrigeration apparatus of a uniform pressure type containing an inert pressure equalizing gas. Refrigerant vapor is expelled from absorption liquid in a boiler pipe 10, and, together with vapor passing from the upper end of a vapor lift tube 11, passes through a conduit 12 to a condenser. The refrigerant vapor, such as ammonia, is liquefied in the condenser and flows into an evaporator in which the refrigerant evaporates and diffuses into an inert gas, such as hydrogen, to produce a refrigerating effect. The resulting gas mixture of refrigerant and inert gas flows from the evaporator to an absorber which may be of an air cooled type including a coil 14 and an absorber vessel 15 to which the lower end of the coil is connected, such gas mixture entering the absorber vessel 15 through a conduit 16.

In the absorber refrigerant is absorbed from the gas mixture into absorption liquid, such as water, which is delivered thereto through a conduit 17, and the absorption liquid enriched in refrigerant passes into the absorber vessel 15. The inert gas is returned from the absorber to the evaporator in a path of flow including a conduit 18, and the enriched absorption liquid is conducted through a conduit 19 and inner pipe 20 of a liquid heat exchanger 21 to the generator.

The absorption liquid from which refrigerant vapor has been expelled, which is referred to as weak absorption liquid, flows from the lower end of boiler pipe 10 into a conduit 22 which forms the outer passage of the liquid heat exchanger 21. From the outer passage of liquid heat exchanger 21 weak absorption liquid flows upwardly through conduit 17 into the upper part of the absorber to absorb refrigerant vapor. In order to simplify the drawing, the condenser, evaporator and connections therefor have not been shown, such parts being well known and their illustration not being necessary for an understanding of our invention.

The generator comprises a heating tube 23 which is heated by an electrical heating element 24 in a manner to be described more fully hereinafter. The boiler pipe 10 and vapor lift tube 11 extend axially of the heating tube 23 and are secured, as by welding, for example, to the outer surface of the tube in good thermal contact therewith, as indicated at 25 and 26 in Fig. 3. The liquid heat exchanger 21 is in the form of a vertically extending coil which projects downwardly from the heating tube 23 and whose upper end is disposed concentrically about the extreme lower closed end of the heating tube. The conduit 22 is connected to the bottom portion of boiler pipe 10 at a region removed from the extreme lower closed end thereof. The boiler pipe 10 extends upwardly from the generator and its upper end forms the conduit 12 through which expelled vapor passes to the condenser, as previously explained.

The inner pipe 20 of the liquid heat exchanger 21 is connected at its upper end to the lower end of the vapor lift tube 11 which is in thermal contact with the heating tube 23 between the points 27 and 28. In this way absorption liquid is heated by heat derived from the electrical heating element 24 and raised to a higher level by vapor lift action into the upper part of the boiler pipe 10. Liquid weak in refrigerant flows by gravity from the boiler pipe 10 to the upper part of absorber coil 14, as previously explained.

The parts of the generator thus far described and liquid heat exchanger 21 are embedded in a single body of suitable insulating material 29 contained within a metal casing or shell 30 having a bottom end wall and a top end wall or cover 46 at a higher level. The heating tube 23 and liquid heat exchanger coil 21 are centrally disposed within the casing 30 and the portions of boiler pipe 10 and vapor lift tube 11 in thermal relation with the heating tube 23 are disposed at diametrically opposite sides thereof. The portions of boiler pipe 10 and vapor lift tube 11, which are above the region thermally connected to the heating tube 23, diverge from the latter and extend upwardly more or less parallel to the heating tube and in spaced relation therewith.

In accordance with our invention the heating tube 23 is embedded in a section of the body of insulating material 29 which is intermediate the ends thereof and spaced from the top and bottom ends of the shell 30, and a permanent passage is provided therein from an end of the shell 30 to the heating tube 23 for insertion and removal of the electrical heating element into and from the heating tube. In the preferred embodiment shown, the electrical heating element 24 is arranged to be positioned within the heating tube 23 through a passageway 31 extending downwardly from the top of the shell 30. However, it will be evident that in certain instances it may be desirable to provide such passageway at the bottom of the generator shell so that it will project upwardly from an opening formed at the lower closed end of the shell. The passageway 31 is defined by a hollow tube 32 which is embedded in the body of insulation 29 and formed with a larger opening 33 at the lower end thereof. The hollow tube 32, which may be referred to as a spacer pipe and desirably formed of relatively thin sheet metal, provides access to the interior of the heating tube 23 and is insulated therefrom by an insulating ring 34 which may be formed of suitable material like asbestos, for example.

In addition, a hollow sleeve member 35, which may be formed of insulating material like glass, for example, is desirably provided within the hollow tube 32 and through which extend the electrical conductors 36 for the electrical heating element 24. The insulating member 35 is removable from the passage 31 independently of the heating element 24 to gain access to the latter through the passage. Further, the insulating member 35, when it is in position in the passage 31, forms a part of the structure which serves to retain the heating element 24 in position in the heating tube, as will be described presently. The heating tube 23 is closed at its lower end and snugly receives the heating element 24 which may comprise a cartridge housing the electrical heating element that generates heat when connected to a source of electrical energy. The electrical energy may be delivered through a supply line 37 to a connecting or terminal block 38 to which the conductors 36 are also connected, access being had to the block upon removing a cover 39 therefrom.

The connecting block 38 is fixed by screws 40 and 41 to a bracket 42 having one portion 42a at a first level and spaced apart tabs or ears 42b at a lower level, as best seen in Fig. 2. The tabs 42b are anchored by screws 43 to a holder or plate 44 formed with a notched portion 45 at which region the holder is secured to the pipe or conduit 12, as shown most clearly in Fig. 2. As best seen in Fig. 1, the tabs 42b of bracket 42 bear against a cover member 46 of the shell or casing 30 and are insulated from the holder 44 by a sheet 47 of insulating material which may be formed of asbestos, for example. Hence, the insulating sheet 47, which is disposed between the underside of the cover member 46 and the holder 44, thermally shields the bracket 42 and connecting block 38 mounted thereon from the holder 44 which is mounted on the conduit 12 forming the vapor line of the generator.

The upper end of the hollow tube 32 is formed with an outwardly extending flange 48 which overlies the edge of the opening or aperture 49 in the cover member 46. The portion 42a of the bracket 42 is of such shape that it covers and overlies the upper flanged end 48 of the hollow tube 32 while providing an opening through which the hollow insulating sleeve 35 can project upwardly against the underside of the connecting block 38, as best seen in Fig. 1.

In view of the foregoing, it will now be understood that an improved electrically operated generator has been provided in which the electrical heating element 24 disposed within the heating tube 23 is effectively insulated from the surroundings to provide a construction which is extremely efficient and in which heat loss is at a minimum. The factors which contribute to this efficiency are insulating the spacer pipe or sleeve 32 from the heating tube 23 and mounting the electrical connecting block 38 in the manner just described so that it is heat conductively insulated and thermally shielded from both the spacer pipe 32 and heating tube 23. In this way the electrical heating element 24 substantially in its entirety is positioned within a part of the generator shell which is completely surrounded by the insulating material 29, the heating tube 23 which receives the heating element being spaced from both ends of the shell 30 and positioned in an intermediate part of the vertically extending shell.

By providing the insulating ring 34 and employing the internal insulating sleeve 35 in the spacer tube 32, a construction is realized in which heat transfer lengthwise of the spacer tube 32 from the heating tube 23 is retarded and heat radiation into the passageway 31 from the wall of the spacer tube 32 is minimized.

In the embodiment illustrated and described it will be seen that the passage 31 through which the heating element or cartridge 24 is inserted into position through the opening 49 in the cover member 46 is located in that part of the body of insulating material 29 through which expelled vapor passes from boiler pipe 10 to the conduit 12 which communicates with the condenser of the refrigeration apparatus. Also, the passage 31 through which the heating element or cartridge 24 is inserted into the heating tube 23 is located in a longitudinally extending section of the body of insulating material 29 which is displaced from and different from the longitudinal section of the insulating body occupied by the liquid heat exchanger 21. Further, the opening 49 in the top cover member 46, which is located at the entrance of the passage 31 through which the heating element 24 is inserted into position, is located a greater distance than the bottom or opposite lower end of the shell 30 from the heat conductive connection of the vapor lift tube 11 to the heating tube 23 between the points 27 and 28.

By positioning the liquid heat exchanger entirely beneath the passage 31 through which the electrical heating element 24 is moved into position, the part of the insulating body 29 enveloping the liquid heat exchanger 21 does not include any parts of the refrigeration apparatus having a higher temperature than that of the weak absorption liquid passing from the generator at the lower end of the boiler pipe 11.

When it becomes necessary to remove the heating element 24 for inspection or checking, or to replace the same, removal of the heating element can be easily effected simply by removing the screws 40 and 41 which fasten the electrical connecting or terminal block 38 to the bracket 42. By mounting the bracket 42 in the manner described above at the open end of the shell 30, the terminal block 38 is insulated from the shell 30 and also from both the heating tube 23 and spacer sleeve 32.

Modifications of the embodiment of our invention which we have described will occur to those skilled in the art, so that we desire our invention not to be limited to the particular arrangement set forth. For example, it may be desirable to position the electrical conductors for supplying electrical energy to the heating element or cartridge in the same longitudinal section of the insulating body as that in which the liquid heat exchanger is embedded, in which case the thermal insulation in the spacer pipe 32 will be effectively employed. Therefore, we intend in the claims to cover all those modifications which do not depart from the spirit and scope of the invention.

What is claimed is:

1. In absorption refrigeration apparatus, a generator comprising a shell having a first end wall at one level and a second end wall at a higher level and an upstanding side wall connecting said first and second end walls, a single body of insulating material retained in said shell between said first and second end walls, a vertically extending heating tube embedded in its entirety in said body of insulating material between said first and second end walls, the end of said heating tube nearer to said first end wall being spaced therefrom and the end thereof nearer to said second wall being spaced therefrom, said heating tube being formed of material having good heat conductivity and providing a heat transfer surface, an electrical heating element positioned in said tube for heating the latter, a circuit for absorption liquid including a plurality of vertically extending parts embedded in said body of insulating material and arranged to receive heat from said heating tube, one of said parts serving as a boiler and another as a vapor lift tube, said shell having an opening in one of the first and second end walls thereof, hollow structure embedded in said body of insulating material to provide a permanent passage therein connecting the opening in said one end wall and one end of said heating tube, said passage being coaxial with said heating tube and having a cross-sectional area throughout the length thereof of adequate size for inserting and withdrawing said heating element into and from said heating tube through the passage, an insulating member which is disposed in said passage and removable therefrom independently of said heating element to gain access to the latter through said passage, and means including said independently removable insulating member, when the latter is positioned in said passage, for retaining said heating element in position in said heating tube.

2. Apparatus as set forth in claim 1 in which said circuit for absorption liquid includes a liquid heat exchanger comprising piping in the form of a coil which is embedded in said body of insulating material and the axis of which extends vertically within said shell, the length of the passage provided by said hollow structure being greater than the overall height of said liquid heat exchanger coil disposed within said shell.

3. In absorption refrigeration apparatus, a generator comprising a shell having a first end wall at one level and a second end wall at a higher level and an upstanding side wall connecting said first and second end walls, a single body of insulating material retained in said shell between said first and second end walls, a vertically extending heating tube embedded in its entirety in said body of insulating material between said first ad second end walls, the end of said heating tube nearer to said first end wall being spaced therefrom and the end thereof nearer to said second end wall being spaced therefrom, said heating tube being formed of material having good heat conductivity and providing a heat transfer surface, an electrical heating element having an electrical connection thereto, said heating element being positioned in said tube for heating the latter, a circuit for absorption liquid including a plurality of vertically extending parts embedded in said body of insulating material and arranged to receive heat from said heating tube, one of said parts serving as a boiler and another as a vapor lift tube, said shell having an opening in one end thereof, means including a hollow member embedded in said body of insulating material to provide a permanent passage therein connecting the opening in said one end wall and one end of said heating tube, said passage being coaxial with said heating tube, the cross-sectional area of said passage throughout the length thereof being of adequate size for inserting and withdrawing said heating element into and from said heating tube through the passage, an elongated body having poor thermal conductivity which is positioned in said passage and apertured to receive the electrical connection to said heating element, the insulating material in said shell bearing against the exterior of said hollow member whose interior provides a housing serving as said passage, said elongated body being removable from said housing through the opening in said one end wall independently of said heating element to gain access to the latter through said passage, and means including said independently removable insulating member, when the latter is inserted into said passage through the opening in said end wall, for retaining said heating element in position in said heating tube.

4. In absorption refrigeration apparatus, a generator comprising a shell having a first end wall at one level and a second end wall at a higher level and an upstanding side wall connecting said first and second end walls, a single body of insulating material retained in said shell between said first and second end walls, a vertically extending heating tube embedded in its entirety in said body of insulating material between said first and second end walls, the end of said heating tube nearer to said first end wall being spaced therefrom and the end thereof nearer to said second end wall being spaced therefrom, said heating tube being formed of material having good heat conductivity and providing a heat transfer surface, an electrical heating element positioned in said tube for heating the latter, a circuit for absorption liquid including a liquid heat exchanger and a plurality of vertically extending parts embedded in said body of insulating material, said parts being arranged to receive heat from said heating tube, one of said parts serving as a boiler and another as a vapor lift tube, said shell having an opening in one of the first and second end walls thereof, hollow structure embedded in said body of insulating material to provide a passage connecting the opening in said one end wall and one end of said heating tube, said passage being coaxial with said heating tube and having a cross-sectional area throughout the length thereof of adequate size for inserting and withdrawing said heating element into and from said heating tube through the passage, said liquid heat exchanger comprising piping embedded in said body of insulating material in one longitudinally extending region thereof, and the passage provided by said hollow structure being located in another longitudinally extending region of said body of insulating material.

5. Apparatus as set forth in claim 4 including provisions for flowing absorption liquid weak in refrigerant and at a relatively high temperature from said boiler to a passage of said liquid heat exchanger, the piping of said liquid heat exchanger receiving the weak absorption liquid constituting the highest temperature part of the refrigeration apparatus embedded in said body of insulating material in said one longitudinally extending region thereof.

6. In absorption refrigeration apparatus, a generator comprising a shell having a first end wall at one level and a second end wall at a higher level and an upstanding side wall connecting said first and second end walls, a single body of insulating material retained in said shell between said first and second end walls, a vertically extending heating tube embedded in its entirety in said body of insulating material between said first and second end walls, the end of said heating tube nearer to said first end wall being spaced therefrom and the end thereof nearer to said second end wall being spaced therefrom, said heating tube being formed of material having good heat conductivity and providing a heat transfer surface, an electrical heating element having an electrical connection thereto, said heating element being positioned in said tube for heating the latter, a circuit for absorption liquid including a plurality of vertically extending parts embedded in said body of insulating material and arranged to receive heat from said heating tube, one of said parts serving as a boiler and another as a vapor lift tube, said shell having an opening in one end thereof, means including a hollow member embedded in said body of insulating material to provide a passage connecting the opening in said one end wall and one end of said heating tube, said hollow member comprising a sleeve which extends inwardly from the opening in said one end wall, the inner end of said sleeve being fixed to the one end of said heating tube and insulated therefrom, said passage being coaxial with said heating tube, the cross-sectional area of said passage throughout the length thereof being of adequate size for inserting and withdrawing said heating element into and from said heating tube through the passage, and an elongated body having poor thermal conductivity which is positioned in said passage and apertured to receive the electrical connection to said heating element, the insulating material in said shell bearing against the exterior of said hollow member, the interior of which provides a housing for said elongated body which is insertable into and removable from such housing through the opening in said one end wall.

7. Apparatus as set forth in claim 6 in which the inner end of said sleeve is insulated from the one end of said heating tube by a tubular section of insulating material retained within said sleeve.

References Cited in the file of this patent
UNITED STATES PATENTS

| 1,738,026 | Wennagel | Dec. 3, 1929 |
| 1,953,994 | Stone | Apr. 10, 1934 |
| 2,269,099 | Grubb | Jan. 6, 1942 |
| 2,521,781 | Doebeli | Sept. 12, 1950 |

FOREIGN PATENTS

| 419,046 | Great Britain | Nov. 5, 1934 |